(12) United States Patent
Okamoto et al.

(10) Patent No.: US 6,976,401 B2
(45) Date of Patent: Dec. 20, 2005

(54) OFFSET ROTARY JOINT UNIT EQUIPPED WITH ROTATION CORRECTION MECHANISM

(75) Inventors: Osamu Okamoto, Tachikawa (JP); Teruomi Nakaya, Machida (JP); Isao Yamaguchi, Tokorozawa (JP); Seizo Suzuki, Tokyo (JP); Jyunichi Ueno, Sanda (JP); Yasuoki Usui, Sanda (JP); Hiroaki Nagano, Itami (JP); Katsuhiko Renbutsu, Itami (JP); Mitsuharu Izaki, Kawanishi (JP); Tadashi Kishimoto, Osaka (JP)

(73) Assignee: National Aerospace Laboratory of Japan, Chofu (JP)

( * ) Notice: Subject to any disclaimer, the term of this patent is extended or adjusted under 35 U.S.C. 154(b) by 228 days.

(21) Appl. No.: 10/190,538

(22) Filed: Jul. 9, 2002

(65) Prior Publication Data
US 2003/0010148 A1 Jan. 16, 2003

(30) Foreign Application Priority Data
Jul. 12, 2001 (JP) .............................. 2001-211999

(51) Int. Cl.[7] .............................................. B25J 18/00
(52) U.S. Cl. .............................. 74/490.05; 74/490.02; 74/490.03; 901/28
(58) Field of Search ........................ 74/490.01, 490.03, 74/490.05, 490.06, 490.02; 901/28, 29

(56) References Cited

U.S. PATENT DOCUMENTS

| | | | |
|---|---|---|---|
| 4,576,545 A | * | 3/1986 | Maeda ........................ 414/735 |
| 4,662,815 A | * | 5/1987 | Zimmer ....................... 414/735 |
| 4,690,012 A | * | 9/1987 | Dahlquist et al. ........ 74/490.06 |
| 4,771,652 A | * | 9/1988 | Zimmer ....................... 74/640 |
| 4,904,148 A | | 2/1990 | Larsson |
| 5,386,741 A | * | 2/1995 | Rennex .................... 74/490.05 |
| 6,408,224 B1 | * | 6/2002 | Okamoto et al. ........... 700/245 |

FOREIGN PATENT DOCUMENTS

| | | | | |
|---|---|---|---|---|
| JP | 56-163624 | | 12/1981 | |
| JP | 4-115592 | | 10/1992 | |
| JP | 2001138279 A | * | 5/2001 | ............ B25J 17/00 |

OTHER PUBLICATIONS

Sungmoo Ryew, et al., IEEE Transactions on Robotics and Automation, vol. 17, No. 3, Jun. 2001, pp. 290-300.

* cited by examiner

*Primary Examiner*—William C. Joyce
(74) *Attorney, Agent, or Firm*—Westerman, Hattori, Daniels & Adrian, LLP

(57) ABSTRACT

An offset rotary joint unit equipped with a rotation correction mechanism, in which a bending motion can be executed in a two-dimensional plane only by virtue of a rotary mechanism and which can support a high-load weight and is applicable for two-arm mechanisms such as nursing assistant robots. One offset rotary joint unit 4 is composed of a first arm 1, a rotation correction arm 2 rotationally driven around the axial line of the first arm, and a second arm 3 rotationally driven around an axial line obliquely intersecting with the rotation correction arm. A rotation correction joint mechanism 5 linking the first arm 1 and the rotation correction arm 2 and an offset rotary joint mechanism 6 linking the rotation correction arm 2 and the second arm 3 are driven by a single motor 12, and the rotation correction joint mechanism 5 rotates synchronously and in the reverse direction, following the rotation of the offset rotary joint mechanism 6, thereby allowing the second arm 3 to execute a bending motion in a two-dimensional plane with respect to the first arm 1 only by virtue of rotary mechanisms.

8 Claims, 6 Drawing Sheets

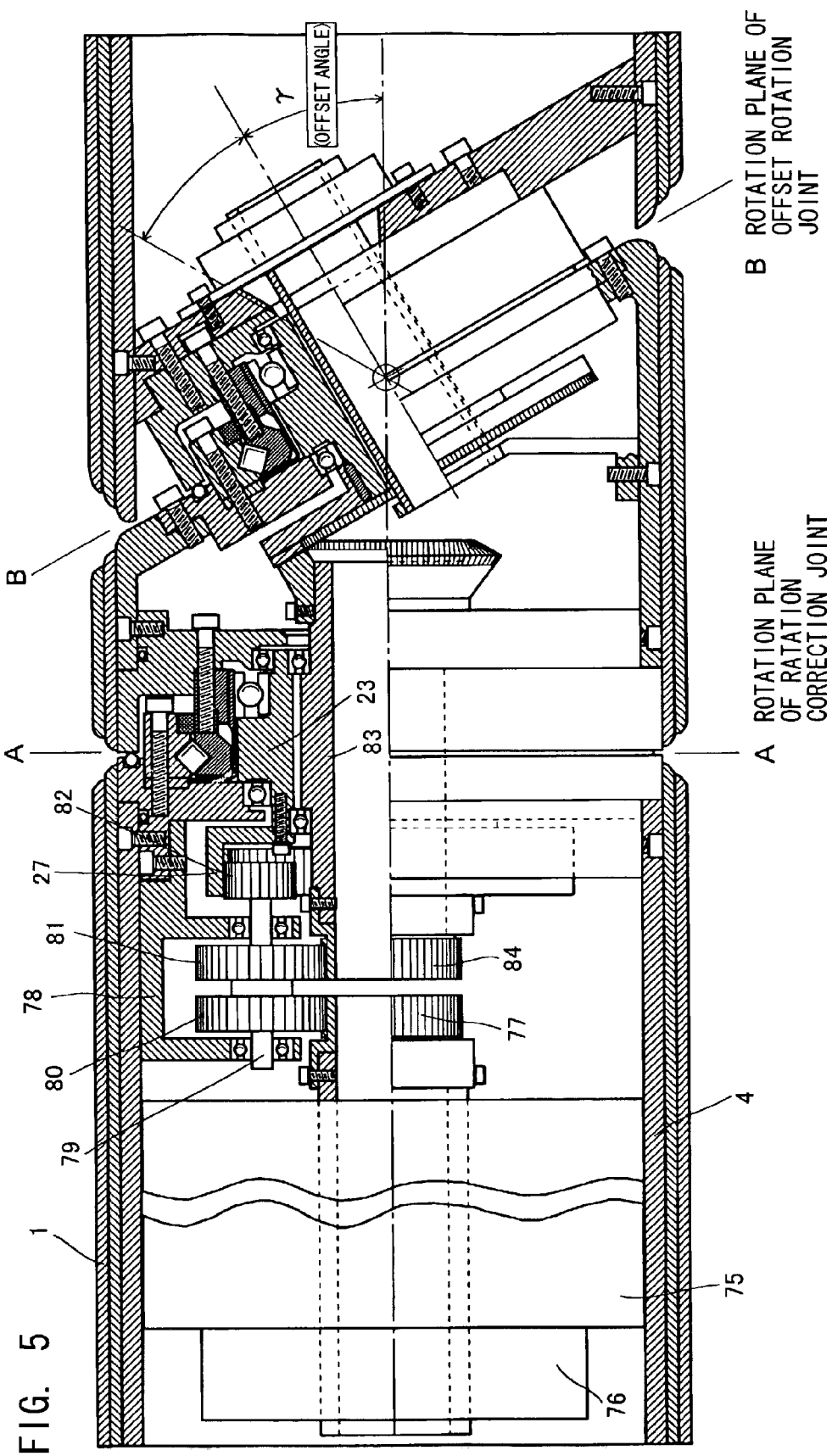

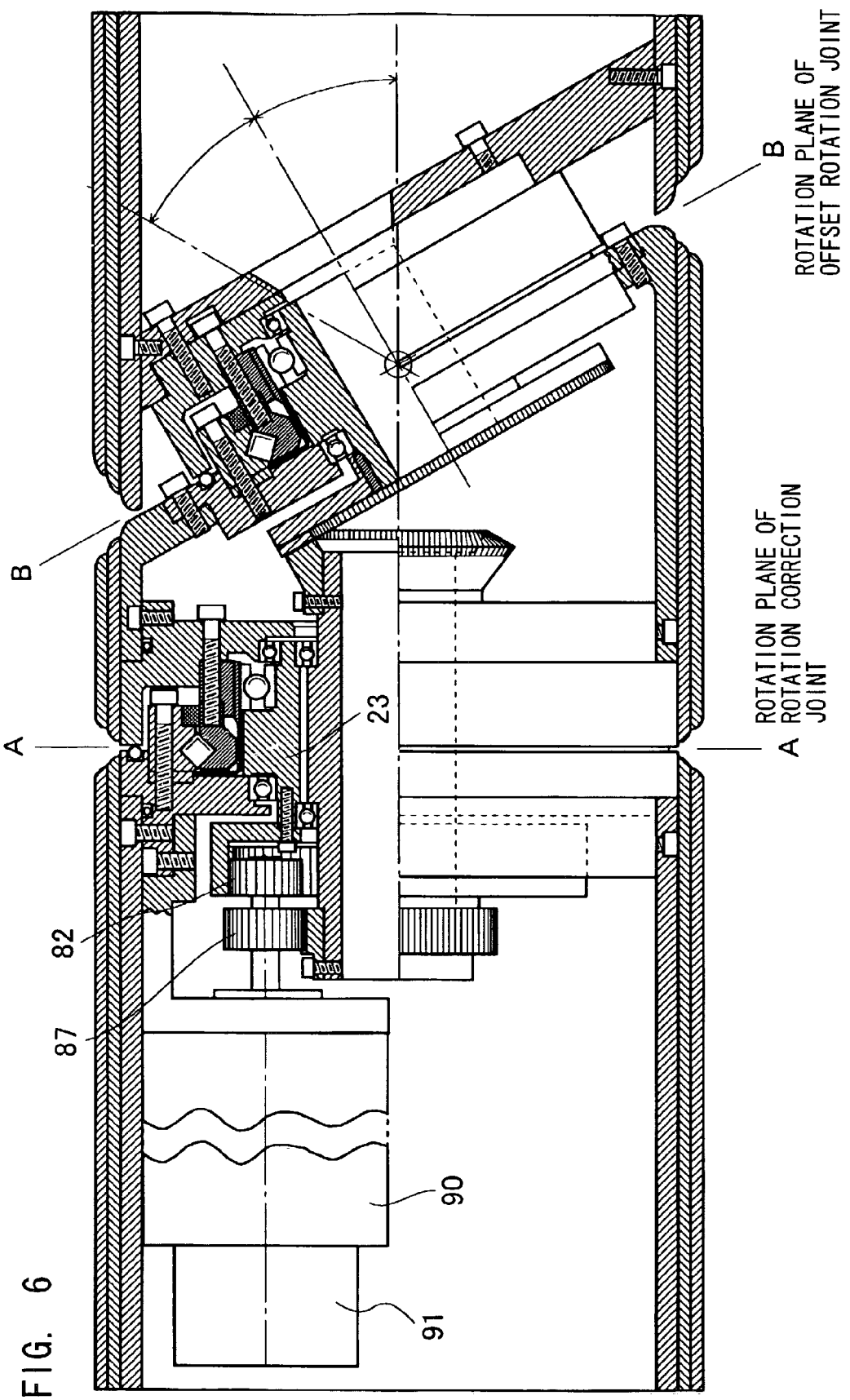

OFFSET ROTARY JOINT UNIT EQUIPPED WITH ROTATION CORRECTION MECHANISM

BACKGROUND OF THE INVENTION

1. Field of the Invention

The present invention relates to an offset rotary joint (slanted plane rotary joint) unit of a robot in which joints can be bent in a two-dimensional plane only with rotation mechanisms, and more particularly to an offset rotary joint unit equipped with a rotation correction mechanism.

2. Description of the Prior Art

A variety of joint mechanisms are used in industrial or entertainment robots. For example, the typically used hinge joint mechanisms composed of a rotary shaft and a bearing unit may be of a shaft drive system in which the bearing unit serves as a fixed shaft and the rotation of a rotary shaft is controlled, a bearing drive system in which the shaft is fixed and the bearing unit rotation is controlled, a link drive system, or a combination thereof. In the shaft drive system and bearing drive system, the entire load on the driven side should be supported and rotationally driven in the same direction as the rotation direction of the shaft rotary unit. Therefore, a large rotation torque is required and the systems are not suitable for a high-load operation. On the other hand, in the link mechanism drive system, a large axial moment was obtained and the system was suitable for a high-load operation. However, since a large link mechanism was required for an external tubular portion, the utilization of the external tubular portion as an arm mechanism of a robot failed to satisfy the requirements placed on the nursing assistant robots that require complex motions.

The inventors have previously suggested an arm-type multi-joint robot in which offset rotary joints are linked to each other as joints designed for a high load, this system being different from that of hinge joints (U.S. patent application Ser. No. 09/708,667). A specific feature of such a multi-joint robot is in that an end effect or can execute a complex motion and the positioning thereof is simple. However, the drawback of such a robot was that because an intermediate joint unit moved in a complex manner in a zigzag direction, the robot was unsuitable for simple motion such as bending in a two-dimensional plane. Furthermore, the motion range of the intermediate joint unit had to be determined in advance.

As described above, in the hinge-type joints of a shaft drive system or a bearing drive system, the inherent weight is received by a thin shaft, and because of the shaft control, a large load is applied to the bearings. Another drawback of such joints is that utilization conditions are degraded because of a structure in which a part of wiring, for example, of motors protrudes to the outside of a cylindrical body. On the other hand, since the offset rotary joints can be composed only of rotary mechanisms, a high load can be handled with comparatively small arms. However, the drawback of such joints is that because of a structure in which a bending angle with respect to a cylindrical body axis is set by conically rotating the shaft maintained at an offset angle (slant angle) with respect to the cylindrical body axis, the direction of bending angle in the intermediate positions cannot be determined. The resulting problem was that, for example, a simple two-dimensional bending motion was difficult to execute.

SUMMARY OF THE INVENTION

It is an object of the present invention to provide an offset rotary joint unit equipped with a rotation correction mechanism that can execute a two-dimensional motion only by virtue of rotary mechanisms, can be implemented in a variety of sizes, from small to large, and can support a high-load weight.

In the process of the research conducted for the purpose of resolving the above-described problems, the inventors have discovered that a two-dimensional bending motion can be executed in an easy manner by providing a rotation correction mechanism that causes rotation in the direction opposite to the rotation direction of an offset rotary joint and constructing the offset rotary joint mechanism and rotation correction mechanism as a pair of joint units. However, since each of the joint mechanisms required an independent rotation control, when the offset rotary joint mechanism and rotation correction mechanism were implemented as a pair of joint units, there was a minute motion delay and bending accuracy was difficult to attain. Furthermore, the combination joint of the offset rotary joint mechanism and rotation correction mechanism was difficult to miniaturize. The present invention is based on the results of the subsequent research.

Thus, in the offset rotary joint unit equipped with a rotation correction mechanism in accordance with the present invention which resolves the above-described problems, one offset rotary joint unit is composed of a first arm, a rotation correction arm rotationally driven around the axial line of the first arm, and a second arm rotationally driven around an axial line obliquely intersecting with the rotation correction arm, the first arm and the rotation correction arm are linked via a rotation correction joint mechanism, and the rotation correction arm and the second arm are linked via an offset rotary joint mechanism.

The advantage of driving the rotation correction joint mechanism and the offset rotary joint mechanism with the same drive source via a two-shaft reversal mechanism is that the control is facilitated, a minute motion delay is eliminated, and the combination joint can be miniaturized. Reverse rotation of the rotation correction joint mechanism, following the rotation of the offset rotary joint mechanism, allows the second arm to execute a two-dimensional bending motion with respect to the first arm only by virtue of a rotary mechanism. It is preferred that the first arm, rotation correction arm, and second arm are formed as hollow cylindrical bodies and that joint control units such as a motor, an angle encoder, a motor control circuit, a communication circuit, and the like be integrally housed inside the hollow cylindrical bodies. It is also preferred that through holes be provided in the rotation correction joint mechanism and the offset rotary joint mechanism, and signal lines and the like be passed therethrough. Furthermore, providing a slip ring for transmitting power and signals between the rotary bodies on a through shaft of the angle encoder eliminates twisting of power lines or signal lines and allows for multiple rotation.

Further, winding touch sensors around the entire first arm, rotation correction arm, and second arm or a portion thereof, disposing touch sensor signal processing circuits inside the arms, picking up the contact pressure information detected by the touch sensors as electric signals and taking it into account in controlling the offset rotary joint unit makes it possible to obtain a joint unit suitable, for example, for arm mechanisms of nursing assistance robots. It is preferred that brake means be provided on one end of the rotating shaft of the two-shaft reversal mechanism. Furthermore, it is preferred that an electromagnetic clutch and brake mechanism be provided on one end of the rotating shaft of the two-shaft reversal mechanism, thereby allowing the rotation correction arm or second arm to be held without rotation. Furthermore, forming bellows on a portion of the hollow cylindrical body of the first arm, rotation correction arm, or second arm makes it possible to provide the arms with flexibility and slipping-preventing function.

BRIEF DESCRIPTION OF THE DRAWINGS

FIG. 5 is a front, partially cross-sectional view of an offset rotary joint unit equipped with a rotation correction mechanism of yet another embodiment of the present invention; and FIG. 6 is a front, partially cross-sectional view of an offset rotary joint unit equipped with a rotation correction mechanism of still another embodiment of the present invention.

DESCRIPTION OF THE PREFERRED EMBODIMENTS

The preferred embodiments of the present invention will be described below in greater detail with reference to the appended figures.

Figure 1:
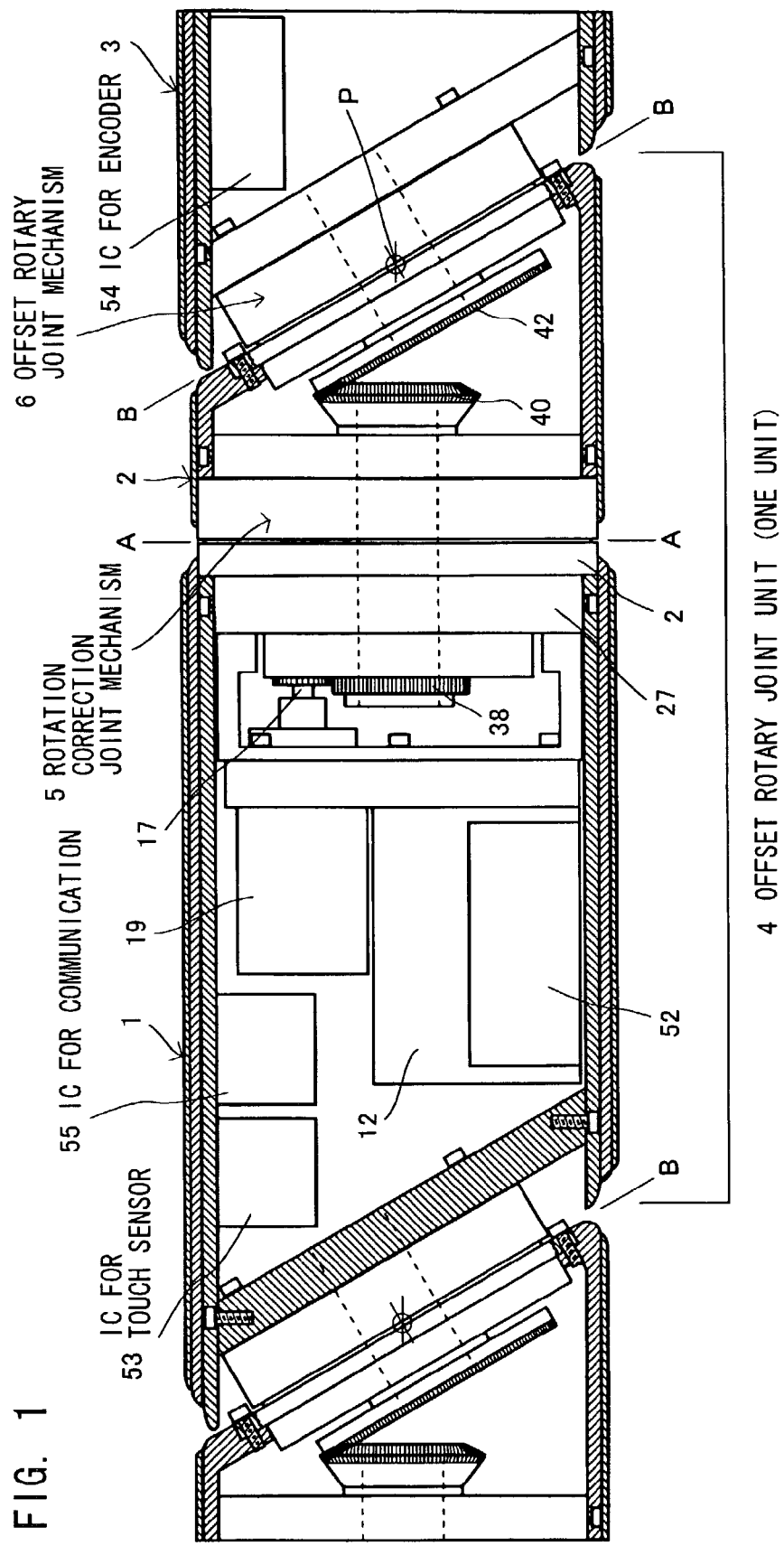
FIG. 1 is a front cross-sectional view of a cylindrical body of an offset rotary joint unit equipped with a rotation correction mechanism of an embodiment of the present invention.
Figure 2:
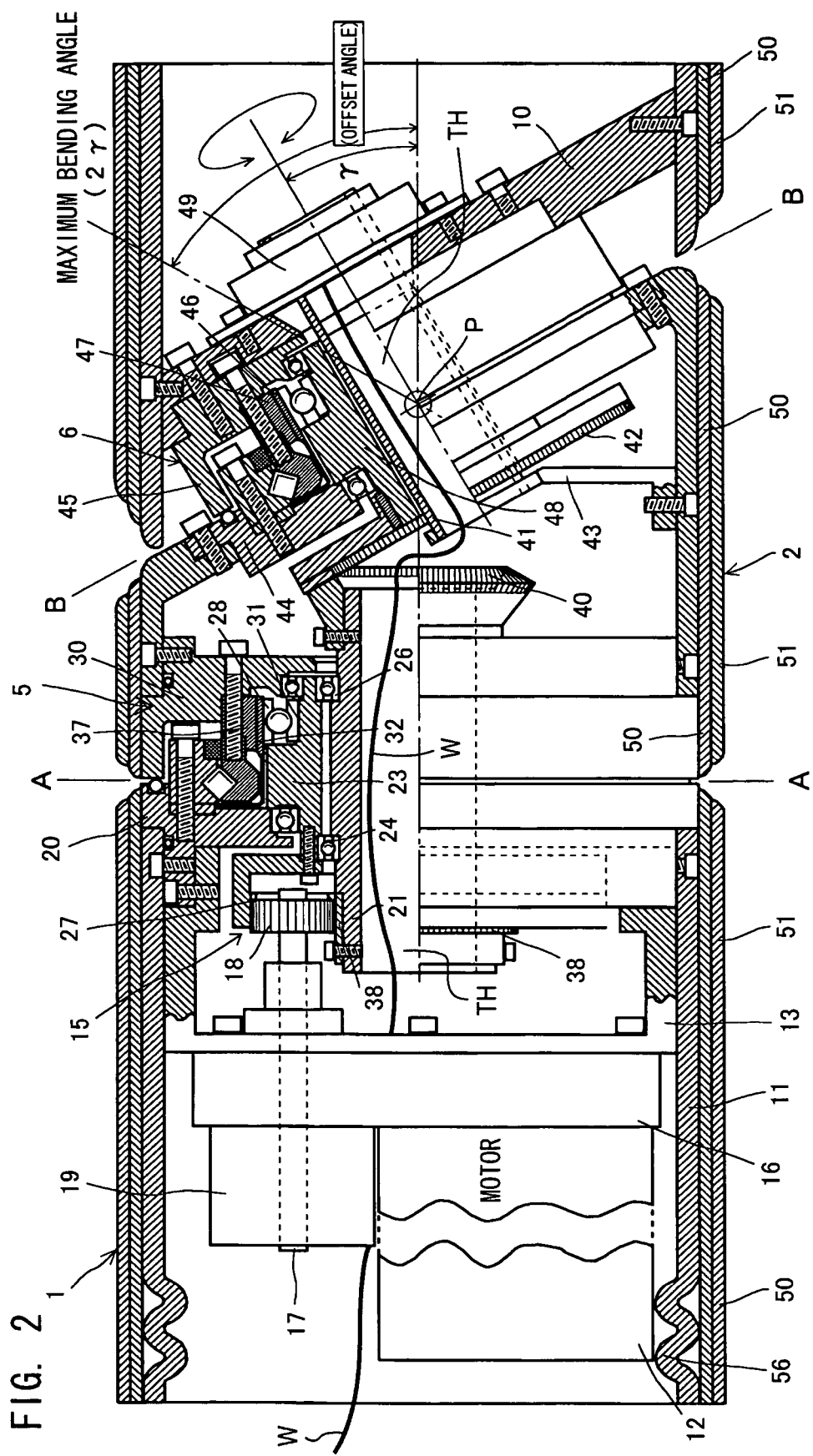
FIG. 2 is a front, partially cross-sectional view thereof.
Figure 3:
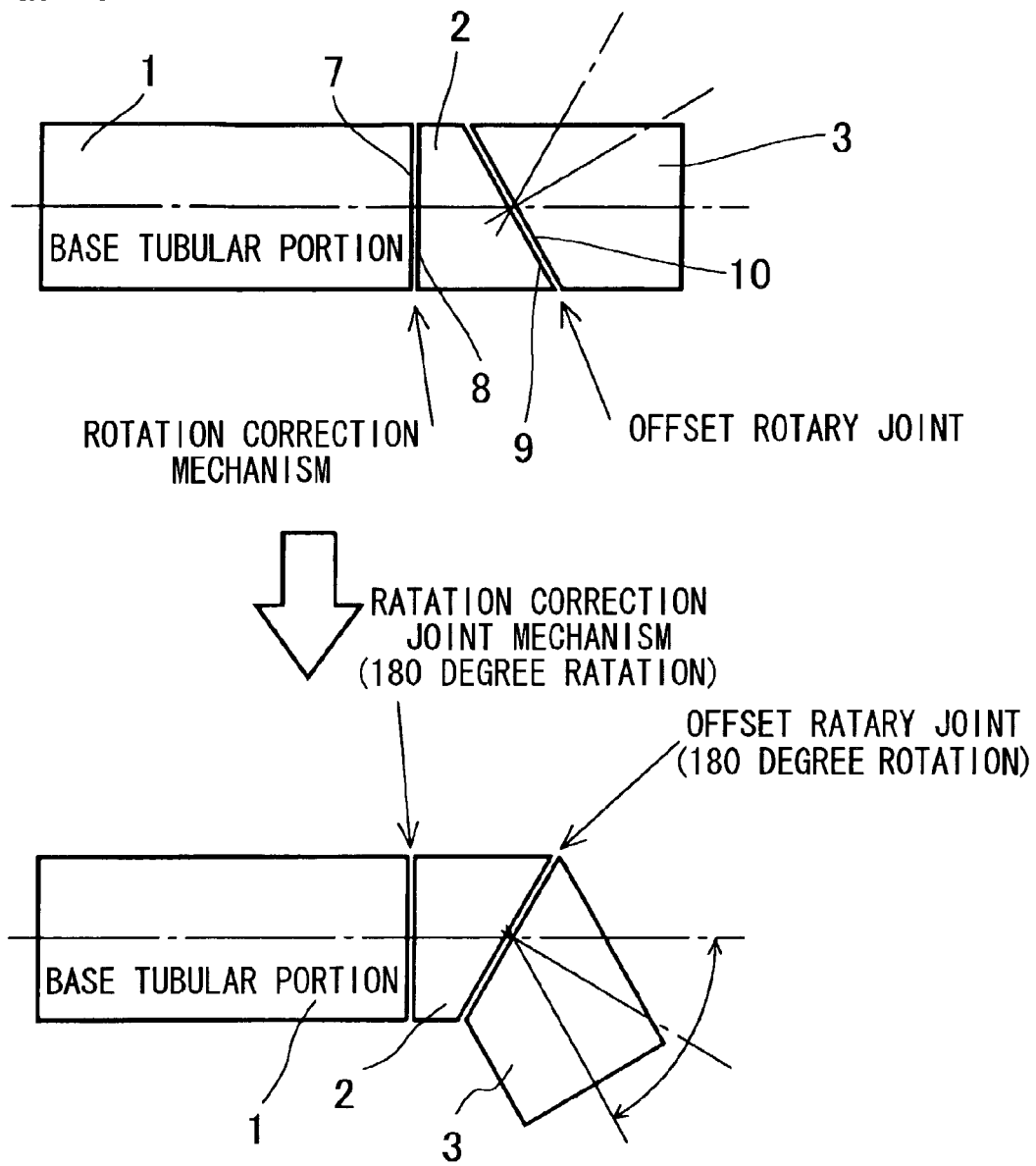
FIG. 3 is a diagram illustrating a bending motion thereof in a two-dimensional plane.

FIG. 1 schematically illustrates an embodiment of an offset rotary joint unit in accordance with the present invention. FIG. 2 is a detailed cross-sectional view thereof. FIG. 3 is a diagram which illustrates the operation thereof.

The figures show a single-joint unit of a multi-joint robot, comprising a first arm 1, a rotation correction arm 2, a second arm 3, and one offset rotary joint unit 4, wherein the second arm 3, combined only with a rotary mechanism, can execute a two-dimensional bending motion shown in FIG. 3 with respect to the first arm 1.

The first arm 1, rotation correction arm 2, and second arm 3 are formed to have a hollow cylindrical shape. As shown schematically in FIG. 3, in the first arm 1, the arm end is a perpendicular plane 7 cut at a right angle to the central axis line, and in the rotation correction arm 2, the end portion at the base end thereof is a perpendicular plane 8 facing the perpendicular plane 7 of the first arm, whereas the end portion at the front end thereof is an inclined plane 9 which is inclined with respect to the central axis line (at an angle of 30° in the present embodiment). Furthermore, the end surface of the second arm 3 at the base end side thereof is an inclined plane 10 facing the inclined plane 9 of the rotation correction arm. The first arm 1 and rotation correction arm 2 are linked via a rotation correction joint mechanism 5 so that the perpendicular planes (A—A planes) face each other, and the rotation correction arm 2 and second arm 3 are linked via an offset rotary joint mechanism 6 so that the inclines planes (B—B planes) face each other. The rotation correction joint mechanism 5 and offset rotary joint mechanism 6 are driven by a motor (a servo motor in the present embodiment) 12 which is a common drive source.

The motor 12 is secured inside the first arm 1 via an appropriate installation base 13 (FIG. 2), and the output shaft thereof is linked to the rotation correction joint mechanism 5 and offset rotary joint mechanism 6 via a two-shaft reversal mechanism 15 for a rotary drive thereof. A drive shaft 17 rotationally driven by an appropriate rotation transmission mechanism 16 from the motor 12 is rotationally supported by the installation base 13, and a gear 18 of the two-shaft reversal mechanism is secured to the front end of the drive shaft. An appropriate brake mechanism 19 such as an electromagnetic brake is provided on the base end side of drive shaft 17, and when the arm is bent at the prescribed angle and retains the position thereof, this position can be continuously maintained against a high load by the operation of the brake mechanism, thereby providing for high safety.

The rotation correction joint mechanism 5 is composed of a stator unit which is a drive side and a rotor unit which is a driven side thereof. The stator unit is linked to the front end of the first arm 1, and the rotor unit is connected to the rotation correction arm 2. As described below in greater detail, a harmonic drive mechanism is composed of the stator unit and rotor unit, providing for transmission of a rotation force with a high reduction ratio from a drive side to the driven side.

A stator housing 20 is secured to the front end of the first arm 1 which serves as a perpendicular opening. A cylindrical shaft 23 for rotation correction joint drive having formed in the central portion thereof a through opening which bears a cylindrical shaft 21 for offset joint drive is rotatably supported by a bearing 24 on the stator housing. The front end of cylindrical shaft 23 for rotation correction joint drive is rotatably supported by a bearing 26 on a rotor housing 30. An internal gear 27 engaged with the gear 18 installed on the drive shaft 17 is secured to the base end side of cylindrical shaft 23 for rotation correction joint drive. The rotation of the internal gear is transmitted as a rotational motion at a high reduction ratio to the rotation correction arm 2 via a harmonic drive mechanism.

A conventional harmonic mechanism can be appropriately used as the above-mentioned harmonic mechanism. In the present embodiment, the outer peripheral surface at the front end side of cylindrical shaft 23 for rotation correction joint drive is an elliptical cam 31, and a bearing 28 is provided between the cam surface and the inner peripheral surface of the front end of an input gear member 32 secured to the stator housing 20. The lower end portion of the input gear member 32 is formed to have a cylindrical shape and to serve as an installation flange. The cylindrical body thereof is formed from an elastically deformable metal material, and the outer teeth are formed on the outer peripheral surface in the upper end portion thereof.

On the other hand, an output gear member 37 having formed on the inner peripheral surface thereof the inner teeth engaged with the outer teeth of the input gear member 32 is secured to the rotor housing 30. The output gear member is rotatably supported by the stator housing 20 and the front end portion thereof is secured to the rotation correction arm 2 via the rotor housing 30. The number of inner teeth of the output gear member 37 is larger (for example, by a factor of two) than the number of outer teeth of the input gear member 32 that can be elastically deformed, and the cylindrical shaft 23 for rotation correction joint drive, input gear member 32, and output gear member 7 constitute the harmonic drive mechanism transmitting the rotation force at a large reduction ratio.

A gear 38 engaged with the drive gear 18 is formed on the outer peripheral surface at the base end side of the cylindrical shaft 21 for offset joint drive, which is rotatably supported in the through hole of the cylindrical shaft 23 for rotation correction joint drive. Therefore, under the driving force of motor 12, the cylindrical shaft 23 for rotation correction joint drive and cylindrical shaft 21 for offset joint drive are rotated in the opposite directions. A bevel gear 40 is secured at the front end of cylindrical shaft 21 for offset joint drive, and this bevel gear is engaged with the internal bevel gear 42 provided on the inclined hollow shaft 41 of the offset rotary joint mechanism 6. The offset rotary joint mechanism 6 has a structure similar to that of the rotation correction joint mechanism 5 in that the rotation force is transmitted to the second arm 3 at a high reduction ratio via a harmonic drive mechanism, the difference between the structures being that the offset rotary joint mechanism 6 is provided at an inclination with respect to the axial line of the first arm and rotation correction arm 2 between the inclined surfaces 9, 10 of rotation correction arm 2 and second arm 3. For this reason, only the reference numerals relating to the offset rotary joint mechanism 6 are explained and the detailed explanation thereof is omitted.

The reference numeral 43 stands for a shaft support base, 44 for a stator housing secured to the inclined surface of rotation correction arm, 45 for a rotor housing secured to the inclined surface 10 of the second arm 3, 46 for an input gear member, and 47 for an output gear member. The rotation force of a cylindrical shaft 48 for offset joint drive is transmitted to the inclined hollow shaft 41 via a bevel gear mechanism and then transmitted to the second arm opposite thereto at the inclined plane via a harmonic drive mechanism. As a result, the second arm 3 executes a conical rotational motion with respect to the rotation correction arm at an inclination angle (offset angle) γ around the rotation center p shown in FIG. 1. An encoder 49 is provided between the inclined hollow shaft 41 and inclined plate 10 of the second arm 3 so as to enable the detection of the rotation angle of the second arm 3 with respect to the inclined hollow shaft 41.

Each arm of the present embodiment is provided with touch sensors 50 wound thereupon, those sensors detecting the touch information such as surface pressure in the outer peripheral portion thereof. The surface pressure acting from the outside onto each arm can thus be detected and the touch information detected by the touch sensors is used as electric signals to control the joint units. As a result, accidents can be prevented by detecting pressure applied when, for example, an arm is brought in contact with an external obstacle during movement thereof, or when a pressure is applied to a human body when an arm of a nursing robot directly supports the human body. Furthermore, if necessary, an elastic outer coating 51 can be provided on each arm to make them suitable for two-arm mechanisms of nursing robots. Furthermore, in the present embodiment, the arms were provided with flexibility and a slipping prevention ability by forming a bellows 56 in which a part of the hollow cylindrical body (tubular body) 11 of the arm was corrugated. However, the bellows is not always required and may be appropriately formed if necessary.

The necessary control circuits such as an IC circuit 52 for motor control, an IC circuit 53 for touch sensors, an IC 54 for the encoder, an IC 55 for communication, and the like are assembled inside the arm as control mechanism for controlling each of the joint units, as shown in FIG. 1, and are connected in a wireless manner (electromagnetic waves, IR radiation) or by a cable (electric cable, optical cable) wired through the hollow part inside the arm to the central control unit controlling the operation of the entire robot.

The offset rotary joint unit equipped with the rotation correction mechanism of the present embodiment has the above-described configuration. When a control value setting the prescribed motion (for example, 60° bending of a joint in a two-dimensional plane) is supplied to a joint unit by a central control unit (not shown in the figure), a control signal is supplied to a servo motor by the IC for motor control and the motor 12 is driven. If the drive shaft 17 is rotated by the motor 12 via the rotation transmission mechanism 16, the cylindrical shaft 23 for rotation correction joint drive and the cylindrical shaft 21 for offset joint drive are rotated in the opposite directions by the two-shaft reversal mechanism 15. The rotation of cylindrical shaft 23 for rotation correction joint drive is transmitted at a high reduction ratio to the rotation correction arm 2 by a harmonic drive mechanism, and the rotation correction arm 2 is rotated around the central axis of the first arm 1. On the other hand, the rotation of the cylindrical shaft 21 for offset joint drive which is rotated in the direction opposite to that of the cylindrical shaft 23 for rotation correction joint drive is transmitted to the cylindrical shaft 48 for offset joint drive which is rotatably fit into the inclined hollow shaft 41 of offset rotary joint mechanism 6 provided with an inclination at the prescribed angle with respect to the axial lines of the first arm 1 and rotation correction arm 2 via a bevel gear mechanism disposed at the front end thereof, and further-transmitted at a high reduction ratio and high torque to the second arm 3 by a harmonic drive mechanism, thereby rotating the second arm 3 around the inclined hollow shaft 41 inclined at the prescribed angle (offset angle) γ with respect to the central axis of rotation correction arm 2. As a result, the second arm 3 executes a three-dimensional motion, that is, a conical rotational motion with respect to the rotation correction arm 2, the trajectory of this motion having a point P shown in FIG. 1 as an apex.

However, since the rotation correction arm 2 rotates synchronously with the second arm, but in the reverse direction, the motion in the direction perpendicular to the paper sheet in FIG. 2 is cancelled by the rotation of rotation correction arm, and the second arm executes a relative rotational motion in a two-dimensional plane. As a result, the second arm 2 bends in a two-dimensional plane with respect to the first arm. Therefore, the bending motion of the arm in a two-dimensional plane can be conducted similarly to a usual hinge joint of a bearing drive system only by virtue of an arm axial rotational motion. In case of a hinge joint of a bearing drive system, the joint mechanism has to be increased to support a large load and is not suitable for supporting a load in the bending direction. By contrast, in the structure of the present embodiment, only a rotary mechanism is used which rotates in the direction perpendicular to the bending direction. Therefore, a large load can also be supported in the bending direction. For example, an object can be supported so as to be held from two sides by using a combination of two arms. Accordingly, the mechanism of the present embodiment is very effective as a joint mechanism of nursing robots or nursing assistant robots. Still another advantage is that since the rotation correction arm and second arm are driven by a single motor, the structure can be simple, lightweight, and small and the control can be conducted in an easy manner, which eliminates motion delays and also improves the bending accuracy.

Furthermore, in the present embodiment, the first arm 1, rotation correction arm 2, and second arm 3 are composed of hollow cylindrical bodies. Therefore, the motor or control devices can be housed inside the arms. Moreover, because through holes TH are formed in the joint mechanisms and a gap is provided between the motor or control devices disposed inside the cylindrical bodies and the inner walls of the cylindrical bodies, electric cables or communication lines W can be passed through inside the arms. Therefore, the cables or lines W are not exposed to the outside, do not hinder the operation, and do not degrade the external appearance.

Figure 4:
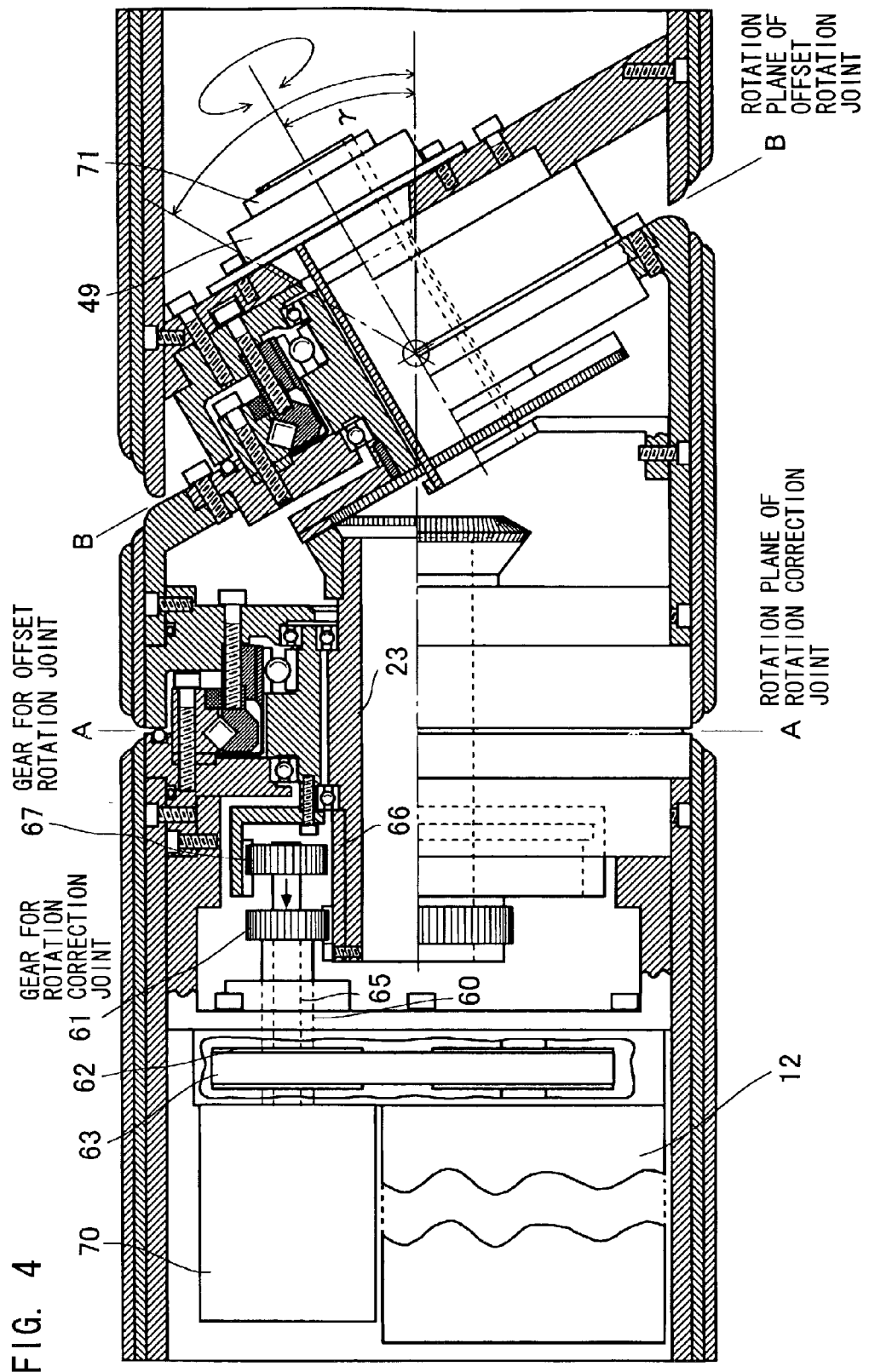
FIG. 4 is a front, partially cross-sectional view of an offset rotary joint unit equipped with a rotation correction mechanism of another embodiment of the present invention.

A representative embodiment of the offset rotary joint unit equipped with a rotation correction mechanism in accordance with the present invention was described above. The present invention is, however, not limited to this embodiment and various design modifications thereof are possible. FIGS. 4 to 6 illustrate other embodiments of the offset rotary joint unit equipped with a rotation correction mechanism in accordance with the present invention. Because those offset rotary joint units equipped with a rotation correction mechanism have the same basic configuration as the unit of the above-described embodiment, only the distinction therebetween will be explained.

In the embodiment shown in FIG. 4, the rotation transmission mechanism for transmitting rotation from the motor 12 to the two-shaft reversal mechanism is different from that of the above-described embodiment. In the present embodiment, the drive shaft is composed of a double shaft, an electromagnetic clutch mechanism and an electromagnetic brake mechanism are provided on the opposite side of the two-shaft reversal mechanism, the rotation correction joint is held so as to be not rotated by the electromagnetic clutch operation, and the offset rotary joint unit can be rotated. Thus, a gear 61 for a rotation correction joint is secured to an external cylindrical shaft 60, and a pulley 62 having a belt 63 stretched between the pulley and the motor shaft of motor 12 is also secured to the cylindrical shaft 60. An offset rotary joint drive shaft 65 is disposed so as to pass inside the cylindrical shaft 60. A gear 67 for offset rotary joint, which is engaged with a gear 66 secured to the cylindrical shaft 23 for offset rotary joint drive is secured to one end of the offset rotary joint drive shaft 65. An electromagnetic brake and clutch device 70 performing a clutch function and a brake function is provided on the other end of the external cylindrical shaft 60 and internal offset rotary joint drive shaft 65. The electromagnetic brake and clutch device 70, with the clutch mechanism thereof, can appropriately switch to (1) a position in which the rotation correction arm 2 and the second arm 3 are rotated synchronously in the mutually opposite directions by transmitting the rotation force of the motor to both the gear 61 for rotation correction joint and the gear 67 for offset rotary joint, (2) a position in which the second arm is rotated in a three-dimensional plane by transmitting the rotation force of the motor only to the gear 67 for offset rotary joint, and (3) a position in which rotation is conducted through the prescribed angle around the axial line of the first arm in a state in which the second arm is secured in a state in which it is bent at a prescribed angle by transmitting the rotation force of the motor only to the gear 61 for rotation correction joint. Furthermore, the electromagnetic brake and clutch device, with the clutch mechanism thereof, activates the brake in those positions and holds the second arm 3 and rotation correction arm so as to prevent rotation thereof. No specific limitation is placed on the structure of the electromagnetic brake and clutch device 70, and any structure thereof may be used, provided that well-known electromagnetic brake mechanism and electromagnetic brake mechanism are assembled so as to execute the above-described action.

Furthermore, in the present embodiment, a slip ring 71 is provided on the through shaft of encoder 49 for detecting the rotation of the offset rotary joint, twisting of the electric power and signal lines passed inside a through hole of the offset rotation correction mechanism is eliminated, and a free rotation control is conducted, without giving consideration to the rotation direction.

FIG. 5 is yet another embodiment of the offset rotary joint unit equipped with a rotation correction mechanism in accordance with the present invention. In this embodiment, the case of the electromagnetic servo rotor also serves as a part of the cylindrical body of the offset rotary joint unit. In this figure, the reference numeral 75 stands for a motor, and the motor case is directly a part of cylindrical body 4. The reference numeral 76 stands for an encoder. The two-shaft reversal mechanism shown in the figure comprises a drive gear 77 installed on a motor shaft, a main shaft 79 rotatably borne on the installation base 78 secured to the cylindrical body 4 of the first arm, a driven gear 80 provided on the main shaft 79, a gear 81 for an offset rotary joint, a gear 82 for rotation correction, a gear 84 secured to the cylindrical shaft 83 for offset rotary joint drive, and an internal gear 27 secured to the cylindrical shaft 23 for rotation correction joint drive. The rotation ratio of the rotation correction arm 2 with respect to the second arm 3 can be freely changed by appropriately setting the rotation ratio of gear 81 for offset rotary joint and gear 84 and the rotation ratio of gear 82 for rotation correction and internal gear 27.

In the offset rotary joint unit equipped with a rotation correction mechanism of the embodiment shown in FIG. 6, the motor 90, the drive gear, and the encoder 91 are directly connected and integrated in order to further decrease the size and simplify the structure. Therefore, the rotation angle of the offset rotary joint mechanism is also controlled by the rotation angle of motor 90. Furthermore, the drive gear of the present embodiment, similarly to the embodiment shown in FIG. 5, is divided into a gear 82 for rotation correction joint and a gear 87 for offset rotary joint, and the gear ratios of the offset rotary joint mechanism and rotation correction joint mechanism can be adjusted by replacing the respective gears.

In all of the above-described embodiments, a harmonic gear mechanism was employed in the electromagnetic mechanism of rotation correction joint mechanism 5 and offset rotary joint mechanism 6, but the present invention is not limited thereto and other gear mechanisms can also be used.

As described above, with the offset rotary joint unit equipped with a rotation correction mechanism in accordance with the present invention, a bending motion in a two-dimensional plane can be conducted similarly to the usual hinge joint mechanism by using only a rotary mechanism. Moreover, since only a rotary mechanism is used, a high load can be supported with a small-size structure and the unit can be used for a two-hand mechanism such as a nursing assistance robot requiring a high load. Driving the rotation correction joint mechanism and offset rotary joint mechanism with a single motor via a two-shaft reversal mechanism facilitates the control and makes it possible to eliminate minute operation delays. Furthermore, the decrease in the number of servo motors makes it possible to decrease the size of the control unit and to miniaturize the combination joints. Furthermore, providing joint control units such as a motor control circuit or communication circuit inside the offset rotary joint unit equipped with a rotation correction mechanism allows independent functions to be provided for each joint unit and facilitates assembly and attachment-detachment operations.

Since each arm constituting the joint unit is formed as a hollow cylindrical body and through holes are provided in the rotation correction joint mechanism and offset rotary joint mechanism, the signal lines and the like can be passed therein, the signal lines or power cables are not exposed to the outside and do not impede the operation. Moreover, providing a slip ring for transmitting power and signals eliminates twisting of power lines or signal lines and allows for multiple rotation. Furthermore, since touch sensors are wound around the entire length of each arm or a portion thereof, forming an outer cover, and the contact pressure information detected by the touch sensors is taken into account in controlling the offset rotary joint unit, contact of the robot arm with an obstacle or a load pressure can be sequentially detected. Therefore, for example, a joint unit can be obtained which is suitable for an arm mechanism of a nursing assistant robot. Furthermore, forming a part of arms as bellows, makes it possible to provide the arms with flexibility and slipping prevention function and to prevent accidents. Moreover, providing brake means on one end of a rotating shaft of a two-shaft reversal mechanism makes it possible to secure each arm reliably in a rotation end position and to further increase safety.

What is claimed is:

1. An offset rotary joint unit equipped with a rotation correction mechanism,
   wherein one offset rotary joint unit comprises a first arm containing a motor, a rotation correction arm rotationally driven around the axial line of said first arm, and a second arm rotationally driven around an axial line obliquely intersecting with said rotation correction arm,
   wherein said first arm and said rotation correction arm are linked via a rotation correction joint mechanism, and said rotation correction arm and said second arm are linked via an offset rotary joint mechanism,
   wherein said rotation correction joint mechanism and said offset rotary joint mechanism are both driven with the same drive shaft and the same drive source via a two-shaft reversal mechanism, and
   wherein the two-shaft reversal mechanism comprises two shafts driven by the motor in opposite directions.

2. The offset rotary joint unit equipped with a rotation correction mechanism according to claim 1, wherein said rotation correction joint mechanism synchronously rotates in a reverse direction relative to the rotation of said offset rotary joint mechanism, thereby allowing said second arm to execute a two-dimensional bending motion with respect to said first arm without the use of a hinge joint.

3. The offset rotary joint unit equipped with a rotation correction mechanism according to claim 2, wherein said first arm, said rotation correction arm, and said second arm are formed as hollow cylindrical bodies, and joint control units including a motor, an angle encoder, a motor control circuit, and a communication circuit are integrally housed inside said hollow cylindrical bodies.

4. The offset rotary joint unit equipped with a rotation correction mechanism according to claim 3, wherein touch sensors are wound around the entire or a portion of said first arm, said rotation correction arm, and said second arm, and covered with a sheath, touch sensor signal processing circuits are disposed inside these arms, and the contact pressure information detected by said touch sensors is picked up as electric signals and taken into account in controlling said offset rotary joint unit.

5. The offset rotary joint unit equipped with a rotation correction mechanism according to claim 1, wherein said first arm, said rotation correction arm, and said second arm are formed as hollow cylindrical bodies, and joint control units including a motor, an angle encoder, a motor control circuit, and a communication circuit are integrally housed inside said hollow cylindrical bodies.

6. The offset rotary joint unit equipped with a rotation correction mechanism according to claim 1, wherein touch sensors are wound around the entire or a portion of said first arm, said rotation correction arm, and said second arm, and covered with a sheath, touch sensor signal processing circuits are disposed inside these arms, and the contact pressure information detected by said touch sensors is picked up as electric signals and taken into account in controlling said offset rotary joint unit.

7. The offset rotary joint unit equipped with a rotation correction mechanism according to claim 1, wherein bellows are formed on a portion of the hollow cylindrical body of said first arm, said rotation correction arm, or said second arm.

8. The offset rotary joint unit equipped with a rotation correction mechanism according to claim 1, wherein an end of said second arm is parallel to an end of said first arm when in an unrotated position.

* * * * *